(12) United States Patent
Karlsson et al.

(10) Patent No.: US 7,497,180 B2
(45) Date of Patent: Mar. 3, 2009

(54) GAS SUPPLY ARRANGEMENT OF A MARINE VESSEL AND METHOD OF PROVIDING GAS IN A GAS SUPPLY ARRANGEMENT OF A MARINE VESSEL

(75) Inventors: Sören Karlsson, Solf (FI); Timo Mahlanen, Helsinki (FI)

(73) Assignee: Wartsila Finland Oy, Helsinki (FI)

( * ) Notice: Subject to any disclaimer, the term of this patent is extended or adjusted under 35 U.S.C. 154(b) by 73 days.

(21) Appl. No.: 10/596,164

(22) PCT Filed: Feb. 25, 2004

(86) PCT No.: PCT/FI2004/050019

§ 371 (c)(1),
(2), (4) Date: Jun. 1, 2006

(87) PCT Pub. No.: WO2005/058692

PCT Pub. Date: Jun. 30, 2005

(65) Prior Publication Data

US 2007/0175226 A1    Aug. 2, 2007

(30) Foreign Application Priority Data

Dec. 18, 2003  (FI) .................................. 20031848
Jan. 30, 2004  (WO) ................. PCT/FI2004/050009

(51) Int. Cl.
F17C 13/00 (2006.01)

(52) U.S. Cl. ...................................... 114/74 R; 62/50.3

(58) Field of Classification Search ................ 114/74 R, 114/74 A; 440/88 F; 62/50.2, 53.2, 240, 62/619
See application file for complete search history.

(56) References Cited

U.S. PATENT DOCUMENTS 4,110,996 A    9/1978 Thompson
(Continued)

FOREIGN PATENT DOCUMENTS

CN    1446728    10/2003
(Continued)

*Primary Examiner*—Ed Swinehart
(74) *Attorney, Agent, or Firm*—Smith-Hill & Bedell, P.C.

(57) ABSTRACT

A gas supply arrangement of a marine vessel being adapted to carry liquefied gas in its cargo tank having an ullage space section and a liquid phase section, which arrangement utilizes the gas as fuel to provide power for the vessel, the arrangement comprising a first gas supply line provided for processing the natural boil-off gas formed in the cargo tank, a second gas supply line which connects the cargo tank and the gas main supply line and which is provided with at least a pump for raising the pressure of the liquid gas and for pumping it forward. The second gas supply line is provided with a gas reservoir having an ullage space section and liquid phase section, and that the arrangement is provided with a first duct section of the second gas supply line connecting the liquid phase section of the cargo tank and the liquid phase section of the gas reservoir, and being provided with the pump, and that the arrangement is additionally provided with a return line connecting the liquid phase section of the reservoir and the cargo tank being provided with a control valve for controllable returning liquid gas back into the cargo tank.

21 Claims, 1 Drawing Sheet

U.S. PATENT DOCUMENTS

| | | |
|---|---|---|
| 4,276,749 A | 7/1981 | Crowley |
| 5,590,535 A | 1/1997 | Rhoades |
| 5,884,488 A | 3/1999 | Gram et al. |
| 6,598,564 B2 * | 7/2003 | Gerstendorfer et al. .. 122/448.1 |
| 2007/0051114 A1 * | 3/2007 | Mahlanen .................. 62/50.1 |

FOREIGN PATENT DOCUMENTS

| | | |
|---|---|---|
| EP | 1291576 | 3/2003 |
| EP | 1348620 | 10/2003 |
| FR | 2722760 | 1/1996 |
| JP | 62182468 | 10/1987 |
| JP | 6123569 | 5/1994 |
| WO | 94/17325 | 8/1994 |

\* cited by examiner

US 7,497,180 B2

GAS SUPPLY ARRANGEMENT OF A MARINE VESSEL AND METHOD OF PROVIDING GAS IN A GAS SUPPLY ARRANGEMENT OF A MARINE VESSEL

This is a national stage application filed under 35 U.S.C 371 based on International Application No. PCT/FI2004/050019 filed Feb. 25, 2004, and claims priority under 35 U.S.C 119 of Finnish Patent Application No. 20031848 filed Dec. 18, 2003 and International Application No. PCT/FI2004/050009 filed Jan. 30, 2004.

BACKGROUND OF THE INVENTION

The invention relates to a gas supply arrangement of a marine vessel and to a method of controlling gas pressure in a gas supply arrangement of a marine vessel.

The usage of gas as energy source in marine vessels is advantageous due to its efficient burning and low emissions. Usually gas is stored in liquefied form because of less space is required for the storage that way.

The propulsion system of LNG (Liquefied Natural Gas) tankers is usually powered by making use of the cargo. Storing of the gas in the tanker is arranged by using heat insulated cargo tanks into which an ullage space section and a liquid phase section are formed. The pressure in the cargo tanks is approximately at atmospheric pressure level and the temperature of the liquefied gas is about minus 163° C. Although the insulation of the cargo tank is extremely good, gradually increasing of the LNG temperature causes formation of so called natural boil-off gas. The natural boil-off gas must be removed in order to avoid extensive increasing of pressure in the cargo tanks. The natural boil-off gas may be utilized in tanker's consumption devices, like in propulsion system. However, the amount of natural boil-off gas is not sufficient for providing all energy required in all circumstances and therefore the vessel must be provided with additional means for acquiring extra gas, so called forced boil-off gas. Additionally the usage of the gas as source of propulsion energy sets requirements for the pressure level and stability of the gas.

For example in a patent publication FR 2722760 there is shown an arrangement in which liquid gas is supplied to a so called forced boiling vaporizer in which the liquid gas vaporizes into gas form, which in turn may be combined with the natural boil-off gas.

EP 1348620 A1 shows a gas supply apparatus in which the natural boil-off gas is led to a compressor, which increase the pressure of the gas prior to feeding it to consumption via a feed line. The capacity of the compressor feeding the natural boil-off gas is controlled by the pressure at the feed line. Additionally, the apparatus also includes a forced boiling vaporizer in which the liquid gas previously pumped to the higher pressure is vaporized. In this arrangement the forced boiling gas portion is combined to the natural boil-off gas after the pressure of the natural boil-off gas has been increased. This arrangement is mentioned to decrease the work required to compress the gas to a given pressure. It has, however, some problems, which are discussed below.

The supply amount of the forced boiling gas is controlled by on-off valve positioned prior to the vaporizer, the control being based on the gas cargo tank pressure. The operation of the pump is also controlled by on-off control based on the pressure of the gas cargo tank. The line between the gas cargo tank and the vaporizer has also a branch for returning a part of pumped liquid gas back to the gas cargo tank. The amount of returned part is controlled based on the pressure of the gas line before the vaporizer. A problem in this arrangement is the returning of the pumped liquid gas back to the cargo tank. That is not desired due to the heating effect of the liquid gas slightly warmed up by the pumping and circulation.

As the consumption of the gas at the outlet side (the feed line) of the vaporizer and compressor varies, the process must be controlled so that the pressure in the gas cargo tank and/or in the feed line will not rise too much and so that required amount of gas may be supplied. When the formation of the natural boil-off gas is not strong enough or consumption is suddenly increasing, the pressure in the ullage space section of the gas cargo tank decreases and the operation of forced boiling vaporizer and liquid gas pump must be started. After operating the pump and the vaporizer a while the pressure will increase to adequate level. Then the pump may be shut down and the valve of the forced boiling vaporizer is also closed. Particularly because the operation of the vaporizer must be precisely controlled, the variation of the pressure in the feed line is inevitably very strong in this kind of a solution. This is even more emphasised by the fact that the vaporizer is typically dimensioned for 100% consumption, which makes the control very rough. Therefore, this kind of a control system is very complicated and also somewhat unstable. Similar arrangement to this is shown in EP 1291576 A2.

An objective of the invention is to provide a gas supply arrangement for a marine vessel, which provides even pressure at the feed line and reliable gas supply for consumption devices of the vessel.

SUMMARY OF THE INVENTION

In the following the invention will be described with a reference mainly to one cargo tank. However, it is clear that a marine vessel may be provided with several cargo tanks each having an individual gas supply arrangement or several cargo tanks may be connected parallel having a shared gas supply arrangement.

Gas supply arrangement of a marine vessel being adapted to carry liquefied gas in its cargo tank having an ullage space section and a liquid phase section, which arrangement utilizes the gas as fuel to provide power for the vessel, the arrangement comprising a first gas supply line provided for processing the natural boil-off gas formed in the cargo tank.

a second gas supply line which connects the cargo tank and the gas main supply line and which is provided with at least a pump for raising the pressure of the liquid gas and for pumping it forward. The second gas supply line is provided with a gas reservoir having an ullage space section and liquid phase section, and the arrangement is provided with a first duct section of the second gas supply line connecting the liquid phase section of the cargo tank and the liquid phase section of the gas reservoir, and being provided with the pump.

The first gas supply line according to an embodiment of the invention connects an ullage space section of the cargo tank and a gas main supply line and which is provided with a compressor for controlling the pressure in the liquefied gas storage tank and in the gas main supply line. However, in some application the processing of natural boil-off gas may comprise a gas re-liquefying apparatus and return line connecting the liquid phase section of the reservoir and the cargo tank and provided with a control valve for controllably returning liquid gas back into the cargo tank.

The first duct section of the second gas supply line and the return line are preferably in heat transfer relation with each other by a first heat exchanger device so that the liquid gas from the cargo tank may be preheated and the returned gas cooled. The heat transfer relation makes it easier to maintain desired temperature in the reservoir. The gas reservoir is provided with a temperature measurement device being adapted to effect on the operation of the control valve. The flow rate of returned gas back to the cargo tank is controlled based on the measured temperature in the reservoir. Since the temperature in the reservoir is maintained about minus 100° C. feeding of gas from the cargo tank has decreasing effect on the temperature in the reservoir.

Method of providing gas in a gas supply arrangement of a marine vessel with liquefied gas tank having an ullage space section and liquid phase section, and a gas consumption device, in which gas from the tank is led to the consumption device via a gas supply line, the gas supply line being provided with a pump for raising the pressure of the liquid gas and pumping it forward. The gas supply line gas is fed into a reservoir having an ullage space section and liquid phase section.

BRIEF DESCRIPTION OF THE DRAWINGS

In the following the invention will be described with the reference to the accompanying schematic drawing, in which.

DETAIL DESCRIPTION

Figure 1:
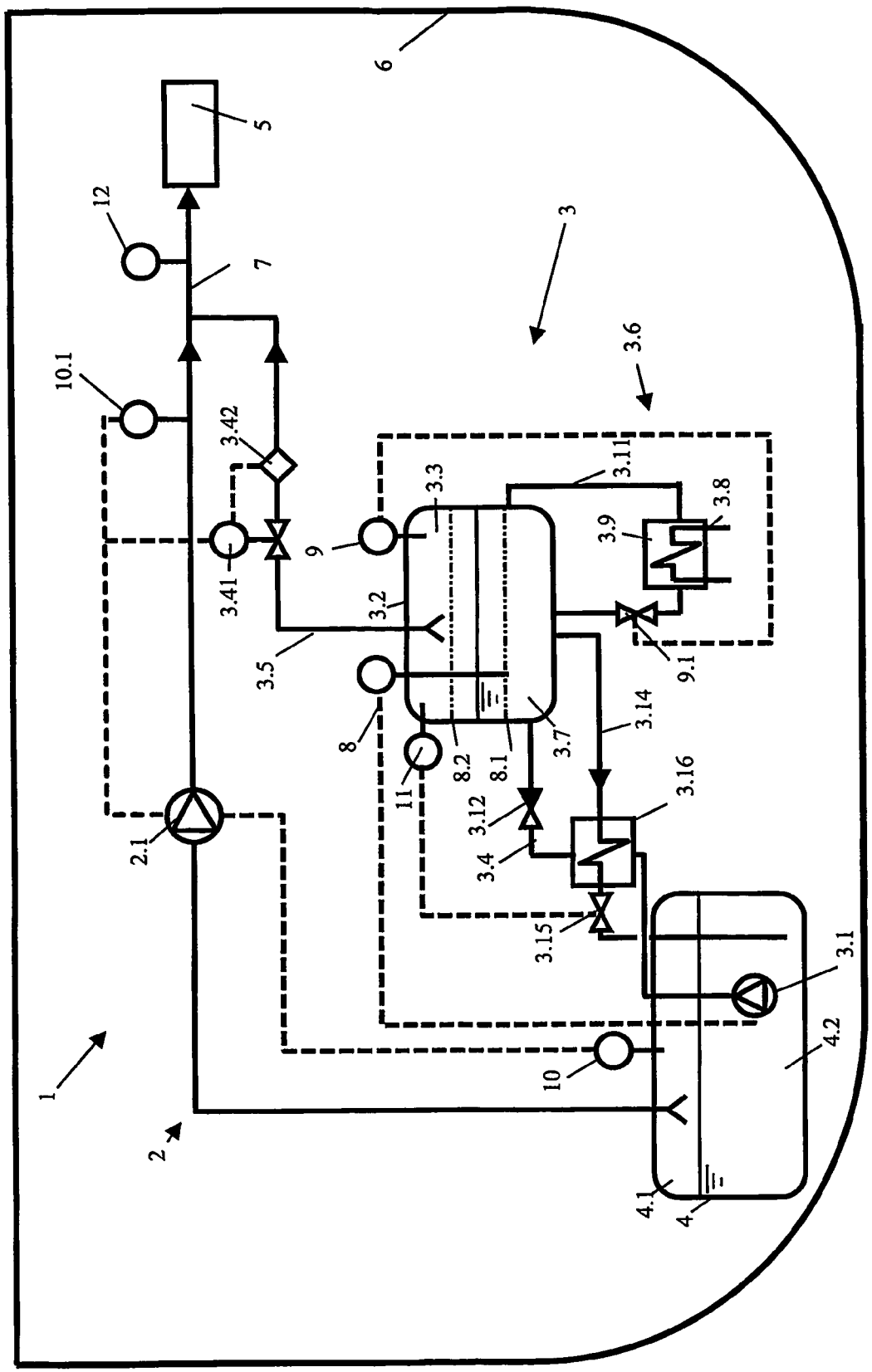
FIG. 1 shows an exemplary preferred of the gas supply arrangement according to the invention.

FIG. 1 depicts schematically cross section of a marine vessel 6, like LNG tanker. The vessel 6 is adapted to carry liquefied gas in its cargo tanks 4. Normally there are several tanks in LNG tanker, but in the figure only one tank 4 is shown for clarity reasons. The cargo tank 4 is filled so that there is always an ullage space section 4.1 filled with gas in gaseous form and a liquid phase section 4.2 filled with liquefied gas. During the storing of the liquefied gas the gas is evaporating changing its phase and transferring to the ullage space section 4.1. The evaporated gas, so called natural boil-off gas, may be utilized in a consumption device 5 of the vessel 6. The consumption device 5 is preferably a gas engine providing propulsion power. In the figure only one consumption device 5 is shown but it is clear that there may be several devices.

In this embodiment the vessel 6 is provided with a gas supply arrangement 1, which comprises a first gas supply line 2 and a second gas supply line 3. The first gas supply line 2 extends from the ullage space section 4.1 of the cargo tank 4 to a gas main supply line 7 leading gas to the consumption device 5. The first gas supply line 2 is adapted for delivering the evaporated boil-off gas from the cargo tank 4 to the consumption device 5 of the vessel 6 via the main supply line 7. The cargo tank 4 is maintained slightly over-pressurized. The first gas supply line 2 is provided with a compressor 2.1 for maintaining the pressure in the cargo tank 4 at desired level and for raising the pressure of the boil-off gas to an adequate level for usage in the consumption device 5. The pressure level in the gas main supply line 7 must be maintained at appropriate pressure but below maximum design limits. The lower limit is typically ruled by requirements of the consumption device 5. The capacity of the compressor 2.1 is controlled by making use of pressure measurement device 10 provided in the cargo tank ullage space, so that the pressure in the cargo tank remains within certain design limits. The operation of the compressor 2.1 is also depending on the pressure in the gas main supply line 7. The gas main supply line 7 is therefore provided with another pressure measurement device 10.1, which transmits pressure value to be used in control procedure of the compressor 2.1. Until the pressure in the gas main supply line 7 has not reached its upper limit the compressor is maintained in operation. The compressor may be provided for example with an inlet vane control, which allows certain variation in the capacity. In case the pressure in the gas main supply line (measured by the device 10.1) is decreasing and simultaneously the pressure in the cargo tank is measured by the device 10 to be too low, an alternate way of producing gaseous gas must be provided.

The purpose of the first gas supply line 2 is primarily to maintain proper pressure level in the cargo tank 4 and in some applications it could be conceivable to replace it e.g. with re-liquefying system and utilize the second gas supply line 3 of the arrangement as explained below.

The above mentioned alternate way of producing gas is accomplished by a second gas supply line 3 provided in the gas supply arrangement 1. The second gas supply line 3 is arranged for converting the liquefied gas into gaseous form for example in case the amount of the natural boil-off gas formation is not enough. The second gas supply line 3 is principally parallel to the first supply line 2, leading from the cargo tank 4 to the main supply line 7. It is provided with a liquid gas pump 3.1 for raising the pressure of the liquid gas to approximately slightly higher level of the main supply line 7 and for transporting the liquid gas into a gas reservoir 3.2 which is provided in the second gas supply line 3. The pump 3.1 is preferably immersed in the liquid phase section 4.2 of the cargo tank 4 so that it pumps the gas in liquid form through a first duct section 3.4 of the second gas supply line 3. The first duct section 3.4 is preferably provided with a check valve 3.12 or automatically controlled valve for preventing the return of the liquid gas back to the cargo tank 4 through this route. At least the pump 3.1 and also the valve 3.12 if not being a check valve, are operated under control of a surface level control arrangement 8 provided in the reservoir 3.2. The pump is started at least when the level of the surface is at its lower limit 8.1 and the pump is running until the surface is raised to its upper limit 8.2. Preferably the surface limits are selected so that the reservoir is about 20% filled at minimum and about 80% filled at maximum. The output of the pump 3.1 is preferably selected so that the ascending speed of the surface is relatively low during the filling. This way the filling of the reservoir 3.2 has minimum impact on the gas pressure in the ullage space section 3.3 of the reservoir 3.2. The effect of the ascending surface to the pressure may be at least partly compensated by properly controlling a reservoir temperature control unit. Due to the properties of the gas i.e. the volume of the gas in gaseous form being approximately 600 times as much as is in liquid form, the output of the pump 3.1 may be selected in this manner without a risking the gas formation capacity. Typically the cargo tank 4 is provided with a so called spray pump, and the pump 3.1 may be a separate pump or the spray pump.

Formation of gaseous gas in the reservoir 3.2 is accomplished partly by arranging the ullage space section 3.3 in the reservoir i.e. taking care that the upper limit 8.2 of the surface of the liquid gas is not too high. However, mainly the gas evaporation is accomplished and simultaneously the pressure level in the ullage space section 3.3 is controlled by vaporizing the gas in the liquid phase section 3.7 of the gas reservoir 3. In practice the arrangement is provided with a combined temperature/pressure control unit 3.6 meaning that the pressure is controlled indirectly by utilizing heat. The unit comprises pressure sensor 9 provided in connection with the reservoir, based on measurement value of which the temperature of the liquid phase section 3.7 is controlled. In other words a part of the liquid gas is heated or at least partly evaporated. The principle of the control is based on the fact that the higher the temperature, the stronger the evaporation of the gas is. So, when the gas from the liquid phase section 3.7 is heated, the formation of gaseous gas is increased and the simultaneously the pressure depending on the consumption, of course.

The heating of the liquid gas in the liquid phase section 3.7 is accomplished by a heat transfer device. The heat transfer device according to a preferred embodiment of the invention comprises an external heat exchanger 3.9 into and from which the liquefied gas is flowing through piping 3.11. The liquefied gas is heated and/or at least partly evaporated by a heat transfer medium flowing in the other side 3.8 of the heat exchanger 3.9. There may be a circulation pump (not shown) for facilitating the flowing of the liquefied gas, but the piping may be so dimensioned that free circulation based on density difference will occur. Heat transfer and thus heating and evaporation of the liquefied gas is controlled partly by a valve 9.1, which controls the flow of the liquid gas into the heat exchanger 3.9. The heat transfer medium may be e.g. glycol-water mixture or steam, but practically any suitable heat source, also electric heater, may be utilized.

Gas from the reservoir is led to the gas main supply line 7 via a second duct section 3.5 of the second gas supply line 3. When the output of the boil-off gas (first gas supply line 2) is not enough for consumption demand, the pressure in the main supply line 7 and also in the ullage space section of the cargo tank 4 will modestly decrease. Subsequently the gas from the ullage space 3.3 of the reservoir 3.2 will be allowed to flow through the second duct section 3.5 into the gas main supply line 7. This causes a minor pressure drop in the ullage space 3.3, which is detected by the sensor 9. The measurement is transmitted to a control device (not shown for clarity reasons) which sends a command to the valve 9.1 in order to actuate opening movement. This, in turn, allows the liquid gas from the gas reservoir 3.2 to flow into the heat exchanger 3.9 in which the temperature of the liquid gas is raised, it may also at least partly evaporate. Since temperature of the liquefied gas is raised it will begin to flow back to the reservoir 3.2. This way the evaporation of the gas is increased and the pressure drop in the ullage space section 3.3 will be compensated. In case other type of heating device would be used its output power would be controlled by the pressure measurement sensor 9.

This kind of a pressure control arrangement is very stable and easy to adjust to maintain the supply line pressure within the required limits. Additionally the reservoir 3.2 provides a buffer for example for situation when the cargo tanks 4 must be cut off from the vessel's gas supply. For example while discharging the cargo tank 4 at port terminal, it may be advantageous to have some buffer volume and therefore the reservoir 3.2 may be dimensioned to have a volume corresponding to at least four hours gas consumption through the gas main supply line 7.

The feeding of the gas from the gas reservoir 3.2 is controlled based on measured flow rate of the gas. The target flow rate value is pre-determined based on the pressures prevailing in the main gas supply line 7 and in the ullage space section of the cargo tank 4. This way only the first supply line 2 is controlled directly based on the pressure measurements in the gas main supply line 7 and the cargo tank 4. The second gas supply line 3 is controlled based on predetermined target value of gas flow rate which, in turn, is based on the pressures. Actual measured flow rate is compared to the target value. The target gas flow rate values are empirically determined for each pair of gas main supply line pressure and cargo tank pressure, and then stored in the control system (not shown) of the arrangement. Thus the target values form e.g. a two-dimensional table in which each combination of the pressures has a certain target flow rate for the forced boil-off gas through the second duct section of the second supply line 3. The second duct section 3.5 is therefore provided with a flow meter device 3.42 and a control valve 3.41. For example, when the pressure in the gas main supply line 7 is low and simultaneously the cargo tank pressure is low, the gas target flow rate is increased and valve 3.41 opened more until the actual flow rate measured by the device 3.42 is substantially equal to the target value. This way there are not two parallel competing control systems and the pressure control is very stable.

The reservoir 3.2 is also provided with a return pipe 3.14, which leads from the liquid phase section of the reservoir back to the cargo tank 4. The return pipe 3.14 is provided with a valve 3.15 for controlling the flow of liquid gas. The valve 3.15 is responsive to the temperature in the reservoir 3.2, which is measure by a temperature measurement device 11 provided in connection with the gas reservoir 3.2. In case the temperature is too high the valve 3.15 is opened and the gas from the liquid phase section of the reservoir 3.2 will flow back to the cargo tank 4. The return flow will be compensated, when necessary, by feed from the cargo tank through the first duct section 3.4. Since the temperature in the cargo tank is about minus 163(C the liquid fed to the reservoir 3.2 will lower the temperature in the reservoir. In order to preheat the liquid gas fed to the reservoir and cool the returned portion of the gas, the flows are in heat transfer relation with each other by a heat exchanger device 3.16.

Particularly in a gas operated vessel having gas engines one must pay attention to the fact that although natural gas is primarily composed of methane, it may also contain ethane, propane and heavier hydrocarbons. Small quantities of nitrogen, oxygen, carbon dioxide, sulphur compounds, and water may also be found in natural gas. The liquefying process requires the removal of some of the components such as water and carbon dioxide from the produced natural gas. In ideal situation it would be beneficial to have only methane remain because it burns efficiently substantially without producing any harmful byproducts. When considering the circumstance in the cargo tanks of an LNG vessel it is evident that the natural boil-off gas contains at least nitrogen in addition to methane due to their boiling point differences and the circumstances in the tanks. The presence of nitrogen decreases the performance of an engine and if the nitrogen content of the gas exceeds a certain level (say 22%) the prime mover might have to be derated. So, it is desirable to minimize the amount of nitrogen in the gas.

By maintaining proper temperature, preferably about minus 100° C. in the reservoir 3.2 it is possible to facilitate separation of compounds contained in the gas, so that evaporation of desired known component or components of the gas occur and some part of the gas is returned to the cargo tank 4. Particularly heavier hydrocarbons may be separated from the gas so that the percentage of methane in the gas fed forward from the reservoir 3.2 is increased, which is beneficial for gas engine operation. This arrangement is beneficial for the operation of the gas engines as the consumption device 5.

In gas engine applications it is advantageous to determine the nitrogen content of the produced gas. Therefore according an embodiment of the invention the arrangement is provided with a gas density measurement device 12 positioned at the gas supply line 7. This results in a simple but reliable manner of determine the amount of nitrogen present in the gas fed through the second gas supply line 3. Now, since the gas provided from the reservoir 3.2 mainly consists of methane and nitrogen, it is possible to determine the amount of nitrogen in the gas. Knowing the density of nitrogen and density of natural gas and measuring the gas density, the percentage of nitrogen may be advantageously determined by following formula.

$$\text{Nitrogen percentage} = \frac{\text{(Measured gas density} - \text{Methane density)}}{\text{(Nitrogen density} - \text{Methane density)}}$$

This information may be used for example in determine the quality of gas used in the consumption device 5.

During the filling of the reservoir 3.2 the pressure in the ullage space 3.3 partly increases due to the ascending surface level, this is registered by the pressure sensor 9, which information is transmitted also to the temperature control unit 3.6.

Control dependencies in the figure are shown informally by dotted lines for clarity reasons. However, it is clear that the control system may be realized by various manners, using centralized or distributed control arrangements.

The invention is not limited to the embodiment shown but several modifications of the invention are conceivable within the scope of the appending claims.

The invention claimed is:

1. A gas supply arrangement of a marine vessel adapted to carry liquefied gas in a cargo tank having an ullage space section and a liquid phase section, the arrangement comprising:
   a gas main supply line for supplying gas to a gas consumption device,
   a first gas supply line which connects the ullage space section of the cargo tank to the gas main supply line and is provided with a compressor for raising the pressure of the gas to an adequate level for the gas main supply line,
   a second gas supply line which connects the liquid phase section of the cargo tank to the gas main supply line and is provided with:
   a pump for raising the pressure of liquid gas in the second gas supply line and for pumping the liquid gas forward in the second gas supply line,
   a gas reservoir having an ullage space section and a liquid phase section,
   a first duct section connecting the liquid phase section of the cargo tank to the gas reservoir, and
   a second duct section connecting the ullage space section of the gas reservoir to the gas main supply line.

2. A gas supply arrangement according to claim 1, wherein the gas reservoir is provided with a temperature control unit.

3. A gas supply arrangement according to claim 2, wherein the temperature control unit comprises a heating device for heating liquid gas in the gas reservoir.

4. A gas supply arrangement according to claim 3, comprising a control device responsive to gas pressure in the gas reservoir for controlling the heating device.

5. A gas supply arrangement according to claim 3, wherein the heating device comprises a heat exchanger external to the gas reservoir and in fluid communication with the liquid phase section of the gas reservoir.

6. A gas supply arrangement according to claim 1, wherein the gas reservoir is provided with a surface level control means for controlling the surface level of the liquid phase section of the reservoir.

7. A gas supply arrangement according to claim 1, wherein the gas reservoir has a volume corresponding to a few hours gas consumption through the gas main supply line.

8. A gas supply arrangement according claim 1, wherein the first duct section of the second gas supply line extends to the liquid phase section of the gas reservoir and the second duct section of the second gas supply line extends from the ullage space section of the gas reservoir to: he gas main supply line.

9. A gas supply arrangement according claim 1, comprising a control valve for automatically closing the second duct section of the second gas supply line.

10. A gas supply arrangement according claim 1, wherein the liquid phase section of the gas reservoir is connected to the cargo tank by a return line provided with a control valve.

11. A gas supply arrangement according to claim 10, wherein the first duct section of the second gas supply line and the return line are in heat transfer relationship with each other.

12. A gas supply arrangement according to claim 10, comprising a heat exchanger for transferring heat between gas in the first duct section of the second gas supply line and the return line.

13. A gas supply arrangement according to claim 10, comprising a temperature measurement device for measuring temperature in the ullage space section of the gas reservoir, and wherein the control valve is responsive to said temperature measurement device.

14. A gas supply arrangement according claim 1, comprising a control unit for controlling pressure in the gas reservoir by controlling heating of gas in the liquid phase section of the gas reservoir.

15. A gas supply arrangement according to claim 14, wherein the control unit comprises a heat transfer device external to the gas reservoir and in fluid communication with the liquid phase section of the gas reservoir.

16. A gas supply arrangement according to claim 15, wherein the heat transfer device comprises a control device responsive to gas pressure in the gas reservoir.

17. A method of supplying gas to a gas consumption device of a marine vessel with a cargo tank for liquefied gas, the cargo tank having an ullage space section and liquid phase section and also having gas main supply line leading to the gas consumption device, said method comprising:
   supplying gas from the ullage space section of the cargo tank to the gas main supply line via a first gas supply line which is provided with a compressor for raising the pressure of gas supplied via the first gas supply line to an adequate level,
   supplying gas to the gas main supply line via a second gas supply line which connects the liquid phase section of the cargo tank to the gas main supply line,
   raising the pressure of liquid gas in the second gas supply line and pumping the liquid gas forward in the second gas supply line to a gas reservoir having an ullage space section and a liquid phase section,
   temporarily storing gas in the gas reservoir, and
   supplying gas from the ullage space section of the gas reservoir to the gas main supply line.

18. A method according to claim 17, comprising controlling temperature of liquid gas in the liquid phase section of the gas reservoir.

19. A method according to claim 18, comprising controlling the temperature in response to pressure in the ullage space section of the gas reservoir.

20. A method according to claim 17, comprising controlling the pressure of gas in the gas main supply line in response to temperature of the liquid phase section of the reservoir.

21. A marine vessel adapted to carry liquefied gas in a cargo tank having an ullage space section and a liquid phase section, the vessel comprising:
- a gas consumption device for utilizing gas from the cargo tank as fuel to provide power for the vessel,
- a first gas supply line connecting the ullage space section of the cargo tank to the gas consumption device,
- a compressor for raising the pressure of gas supplied through the first gas supply line to an adequate level for supply to the gas consumption device,
- a second gas supply line connecting the liquid phase section of the cargo tank to the gas consumption device, and
- pump for raising the pressure of liquid gas in the second gas supply line and pumping the liquid gas toward the gas consumption device,
- wherein the second gas supply line includes a gas reservoir having an ullage space section and a liquid phase section, a first duct connecting the liquid phase section of the cargo tank to the gas reservoir, and a second duct connecting the ullage space section of the gas reservoir to the gas consumption device.

* * * * *